United States Patent
Krah

(10) Patent No.: US 8,054,299 B2
(45) Date of Patent: Nov. 8, 2011

(54) DIGITAL CONTROLLER FOR A TRUE MULTI-POINT TOUCH SURFACE USEABLE IN A COMPUTER SYSTEM

(75) Inventor: Christoph H. Krah, Los Altos, CA (US)

(73) Assignee: Apple Inc., Cupertino, CA (US)

(*) Notice: Subject to any disclaimer, the term of this patent is extended or adjusted under 35 U.S.C. 154(b) by 958 days.

(21) Appl. No.: 11/621,067

(22) Filed: Jan. 8, 2007

(65) Prior Publication Data
US 2008/0165134 A1    Jul. 10, 2008

(51) Int. Cl.
G06F 3/045    (2006.01)
G06F 3/044    (2006.01)

(52) U.S. Cl. .................. 345/174; 178/18.06

(58) Field of Classification Search .......... 345/173–174; 178/18.06, 19.03; 349/12
See application file for complete search history.

(56) References Cited

U.S. PATENT DOCUMENTS

| | | | |
|---|---|---|---|
| 5,483,261 A | | 1/1996 | Yasutake |
| 5,488,204 A | | 1/1996 | Mead et al. |
| 5,565,658 A | * | 10/1996 | Gerpheide et al. .......... 178/18.02 |
| 5,825,352 A | | 10/1998 | Bisset et al. |
| 5,835,079 A | | 11/1998 | Shieh |
| 5,856,822 A | * | 1/1999 | Du et al. .......................... 345/73 |
| 5,880,411 A | | 3/1999 | Gillespie et al. |
| 6,188,391 B1 | | 2/2001 | Seely et al. |
| 6,191,723 B1 | * | 2/2001 | Lewis ............................. 341/166 |
| 6,275,047 B1 | * | 8/2001 | Zoellick et al. ................ 324/678 |
| 6,310,610 B1 | | 10/2001 | Beaton et al. |
| 6,323,846 B1 | | 11/2001 | Westerman et al. |
| 6,570,557 B1 | | 5/2003 | Westerman et al. |
| 6,677,932 B1 | | 1/2004 | Westerman |
| 6,690,387 B2 | | 2/2004 | Zimmerman et al. |
| 6,795,359 B1 | * | 9/2004 | Baker ............................. 365/209 |
| 6,888,536 B2 | | 5/2005 | Westerman et al. |
| 7,015,894 B2 | | 3/2006 | Morohoshi |
| 7,145,350 B2 | * | 12/2006 | Mellert et al. ................. 324/678 |
| 7,184,064 B2 | | 2/2007 | Zimmerman et al. |
| RE40,153 E | | 3/2008 | Westerman et al. |
| 7,339,580 B2 | | 3/2008 | Westerman et al. |

(Continued)

FOREIGN PATENT DOCUMENTS

JP    2000/163031 A    6/2000

(Continued)

OTHER PUBLICATIONS

International Search Report mailed Jan. 29, 2009, for PCT Application No. PCT/US2008/050442, filed Jan. 7, 2008, five pages.

(Continued)

*Primary Examiner* — Bipin Shalwala
*Assistant Examiner* — Keith Crawley
(74) *Attorney, Agent, or Firm* — Morrison & Foerster LLP

(57) ABSTRACT

An embodiment of an improved touch surface controller for controlling a multi-point touch surface such as a touch screen or a touch pad in a computer system is disclosed. The improved touch system controller detects signal capacitance from the pixels in the touch surface digitally, and therefore is easier and simpler to implement then previous approaches relying on analog detection and processing. Specifically, signal capacitance is measured by measuring a number of clock cycles taken to discharge or charge the input node of a comparator. Embodiments of the disclosed touch surface controller are particularly useful in the context of detecting multiple simultaneous touches on the touch surface.

33 Claims, 5 Drawing Sheets

U.S. PATENT DOCUMENTS

| | | | |
|---|---|---|---|
| 2004/0104826 A1 | 6/2004 | Philipp | |
| 2004/0243747 A1* | 12/2004 | Rekimoto | 710/72 |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0033724 A1 | 2/2006 | Chaudhri et al. | |
| 2006/0053387 A1 | 3/2006 | Ording | |
| 2006/0085757 A1 | 4/2006 | Andre et al. | |
| 2006/0097991 A1 | 5/2006 | Hotelling et al. | |
| 2006/0197753 A1 | 9/2006 | Hotelling | |
| 2007/0229466 A1* | 10/2007 | Peng et al. | 345/173 |
| 2007/0257890 A1 | 11/2007 | Hotelling et al. | |
| 2008/0165134 A1 | 7/2008 | Krah | |

FOREIGN PATENT DOCUMENTS

| | | |
|---|---|---|
| JP | 2002-342033 A | 11/2002 |
| WO | WO-96/18179 A1 | 6/1996 |
| WO | WO-2008/086315 A2 | 7/2008 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

Row projection signal

Column projection signal

DIGITAL CONTROLLER FOR A TRUE MULTI-POINT TOUCH SURFACE USEABLE IN A COMPUTER SYSTEM

BACKGROUND

There exist today many styles of input devices for performing operations in a computer system. The operations generally correspond to moving a cursor and/or making selections on a display screen. By way of example, the input devices may include buttons or keys, mice, trackballs, touch pads, joy sticks, touch screens and the like. Touch pads and touch screens (collectively "touch surfaces") are becoming increasingly popular because of their ease and versatility of operation and their declining price. Touch surfaces allow a user to make selections and move a cursor by simply touching the surface, which may be a pad or the display screen, with a finger, stylus, or the like. In general, the touch surface recognizes the touch and position of the touch and the computer system interprets the touch and thereafter performs an action based on the touch.

Touch screens are of particular interest. Various types of touch screens are described in U.S. patent application Ser. No. 10/840,862, filed May 6, 2004, which is hereby incorporated by reference in its entirety. A touch screen 4 is generally a clear panel with a touch sensitive surface. As shown in FIG. 1, a multi-point capable touch screen 4 generally comprises an array of pixels 83, defined by the intersection of rows 81 and column 82. Specifically, at each pixel 83, a capacitance exists, Csig, which is the capacitance between its associated row and column. As is well known, a touch event in the vicinity of a given pixel 83 will change its capacitance, Csig. A touch surface controller 400 detects the capacitance of each of the pixels 82 in the screen 4, and thus includes detection circuitry 87 for this purpose. Once the capacitances are detected, the capacitance values are typically latched (88) for each column 82 on a row-by-row basis, and then are exported to a system microprocessor 90, e.g., the main microprocessor in the computer (not shown) to which the touch screen 4 is attached. At the system microprocessor 90, the capacitance values for each pixel (e.g., C1 . . . C16 in the simple example shown) are assessed to discern the location of a touch.

There are several types of touch screen technologies including resistive, capacitive, infrared, surface acoustic wave, electromagnetic, near field imaging, etc. Each of these devices has advantages and disadvantages that are considered when designing or configuring a touch screen. One problem found in these prior art technologies is that they are only capable of reporting a single point even when multiple objects are placed on the sensing surface. That is, they lack the ability to track multiple points of contact simultaneously. In resistive and traditional capacitive technologies, an average of all simultaneously occurring touch points are determined and a single point which falls somewhere between the touch points is reported. In surface wave and infrared technologies, it is impossible to discern the exact position of multiple touch points that fall on the same horizontal or vertical lines due to masking. In either case, faulty results are generated.

These problems are particularly problematic in handheld devices, such as tablet PCs, where one hand is used to hold the tablet and the other is used to generate touch events. For example, as shown in FIGS. 2A and 2B, holding a tablet causes the thumb 3 to overlap the edge of the touch screen 4. If the touch technology uses averaging, the technique used by resistive and capacitive panels, then a single point 2 that falls somewhere between the thumb 3 of the left hand and the index finger 6 of the right hand would be reported. As shown in FIG. 2B, if the technology uses projection scanning, the technique used by infrared and surface acoustic wave panels, it is hard to discern the exact vertical position of the index finger 6 due to the large vertical component of the thumb 3. In essence, the thumb 3 masks out the vertical position of the index finger 6.

Solutions to this problem of accurately detecting multiple touches are provided in U.S. patent application Ser. No. 11/381,313 (the '313 application), filed May 2, 2006, which is incorporated herein by reference in its entirety. The '313 application discloses a controller for multi-touch surfaces, and figures taken from that application are shown here in FIGS. 3A and 3B. Because familiarity with the '313 application is assumed, the circuitry of FIGS. 3A and 3B is only briefly explained.

A charge amplifier 401 is used in the input stage of the touch surface controller 400 of the '313 application, which for the most part can be implemented in an Application Specific Integrated Circuit (ASIC). Essentially, the charge amplifier 401 is used to measure the charge of the capacitance Csig one of the pixels 83 of the touch screen 4. Essentially, and as one skilled in the art will realize, the charge amplifier 401 of FIG. 2A comprises integration circuitry.

As shown in FIG. 3B, the output of charge amplifier 401 passes to a demodulator 403. The purpose of demodulator 403 is to reject out-of-band noise sources (from cell phones, microwave ovens, etc.) that are present on the signal entering controller 400. The output of the charge amplifier 401 is mixed with a quantized waveform that is stored in a lookup table 404. More specifically, the shape, amplitude, and frequency of the demodulation waveform are determined by coefficients in the lookup table 404. The demodulation waveform determines pass band, stop band, stop band ripple and other characteristics of the subtractor 402. In a preferred embodiment, a Gaussian shaped sine wave is used as the demodulation waveform, which provides a sharp pass band with reduced stop band ripple.

Another aspect of demodulator 403 relates to demodulator phase delay adjustment. As can be seen with reference to FIGS. 1, 3A, and 3B, the pixels of the touch screen 4 are accompanied by parasitic capacitances, shown as Cstray 460, which would generally be associated with each column 82 in the array. (Parasitic resistance would also be present, but are ignored here for simplicity). Accordingly, the touch screen 4 will impose a phase delay on the stimulus waveform, Vstim passing through it, which stimulus waveform can come from stimulation circuitry 85. This stimulation circuitry 85 can comprise part of the controller 400, or can come from another independent drive source. This phase delay is negligible for traditional opaque touch panels in which the electrode structure is typically formed by PCB traces having negligible resistance. However, for transparent panels, typically constructed using Indium Tin Oxide (ITO) conductive traces, the associated phase delay may be quite large. To compensate for this phase delay, the demodulation waveform is delayed relative to the signal entering the charge amplifier 401 and ultimately the demodulator 403. Again, each pixel 83 of the touch surface may have its own uniquely determined delay parameter, or the delay parameter may be determined on a row-by-row basis.

The demodulated signal is then passed to offset compensation circuitry comprising a subtractor 402 and a programmable offset Digital-to-Analog Converter (DAC) 405. The compensation circuitry is necessary because the pixel capacitance is comprised of a static part (a function of sensor construction, including Cstray) and a dynamic part (resulting from a touch, such as would vary Csig), and it is desirable to remove the static prior to analog to digital conversion in order to increase the dynamic range of the measurement. Therefore, subtractor 402 takes the output of the demodulator 403 and subtracts an offset voltage. Specifically, offset DAC 405 generates a programmable offset voltage from a digital static offset value, Voff_reg. This digital value is converted into a static analog voltage (or current, if operating in the current domain) by the DAC 405 and then mixed (by multiplier 403b) with a voltage (or current) set by the absolute value (block 404b) of the demodulation waveform. The result is a rectified version of the demodulation waveform, the amplitude of which is set by the static value of Voff_reg and the absolute portion of the demodulation waveform currently retrieved from the demodulator lookup table 404. In short, the offset compensation waveform effectively tracks the demodulation waveform.

The demodulated, offset compensated signal is then processed by a programmable gain Analog-to-Digital (ADC) 406. ADC 406 may comprise a sigma-delta circuit, although this is not strictly necessary. The ADC 406 performs two functions: (1) it converts the offset compensated waveform out of the mixer arrangement (offset and signal mixer) to a digital value; and (2) it performs a low pass filtering function, i.e., it averages the rectified signal coming out of the subtractor 402. The offset compensated, demodulated signal comprises a rectified Gaussian shaped sine wave, whose amplitude is a function of Cfb and Csig. The ADC 406 output, X, comprises the average of that signal, and ultimately comprises a digital representation of Csig. This digital signal X is sent from the controller 400 to a microprocessor in the computer system (not shown), which interprets the signal to arrive at a conclusion of the location of the touch (or touches).

Some products are able to detect multiple touch points, such as the Fingerworks series of touch pad products. Moreover, numerous examples of multiple touch events being used to control a host device have been disclosed in the literature. See U.S. Pat. Nos. 6,323,846; 6,888,536; 6,677,932; 6,570,557, and U.S. patent application Ser. Nos. 11/015,434; 10/903,964; 11/048,264; 11/038,590; 11/228,758; 11/228,700; 11/228,737; 11/367,749, each of which is hereby incorporated by reference in their entireties. Unfortunately, these products generally only work on opaque surfaces because of the circuitry that must be placed behind the electrode structure. Moreover, historically, the number of touches detectable with such technology has been limited by the size of the detection circuitry.

While the approach of the '313 application (FIGS. 3A and 3B) certainly alleviates these problems to a degree, it still is the case that the analog-based nature of the detection circuitry employed in that application can be difficult or costly to implement. First, the detection circuitry of FIGS. 3A and 3B, being largely analog in nature, takes up significant space on the controller 400. Second, the manner of detection employed by the circuitry is complicated, requiring amplification, demodulation, offset, and delta-sigma conversion, which in total is space- and power-intensive on the controller 400. In short, the detection method employed by the '313 application, while effective in providing an indicia of Csig for each pixel to the microcontroller in the computer system (not shown), is not efficient. Improvements in such a touch surface controller, therefore, would be beneficial.

BRIEF DESCRIPTION OF THE DRAWINGS

Corresponding reference characters indicate corresponding components throughout the several views of the drawings.

DETAILED DESCRIPTION

The following description is of the best mode presently contemplated for carrying out the invention. This description is not to be taken in a limiting sense, but is made merely for the purpose of describing the general principles of the invention. The scope of the invention should be determined with reference to the claims and their equivalents.

Figure 1:
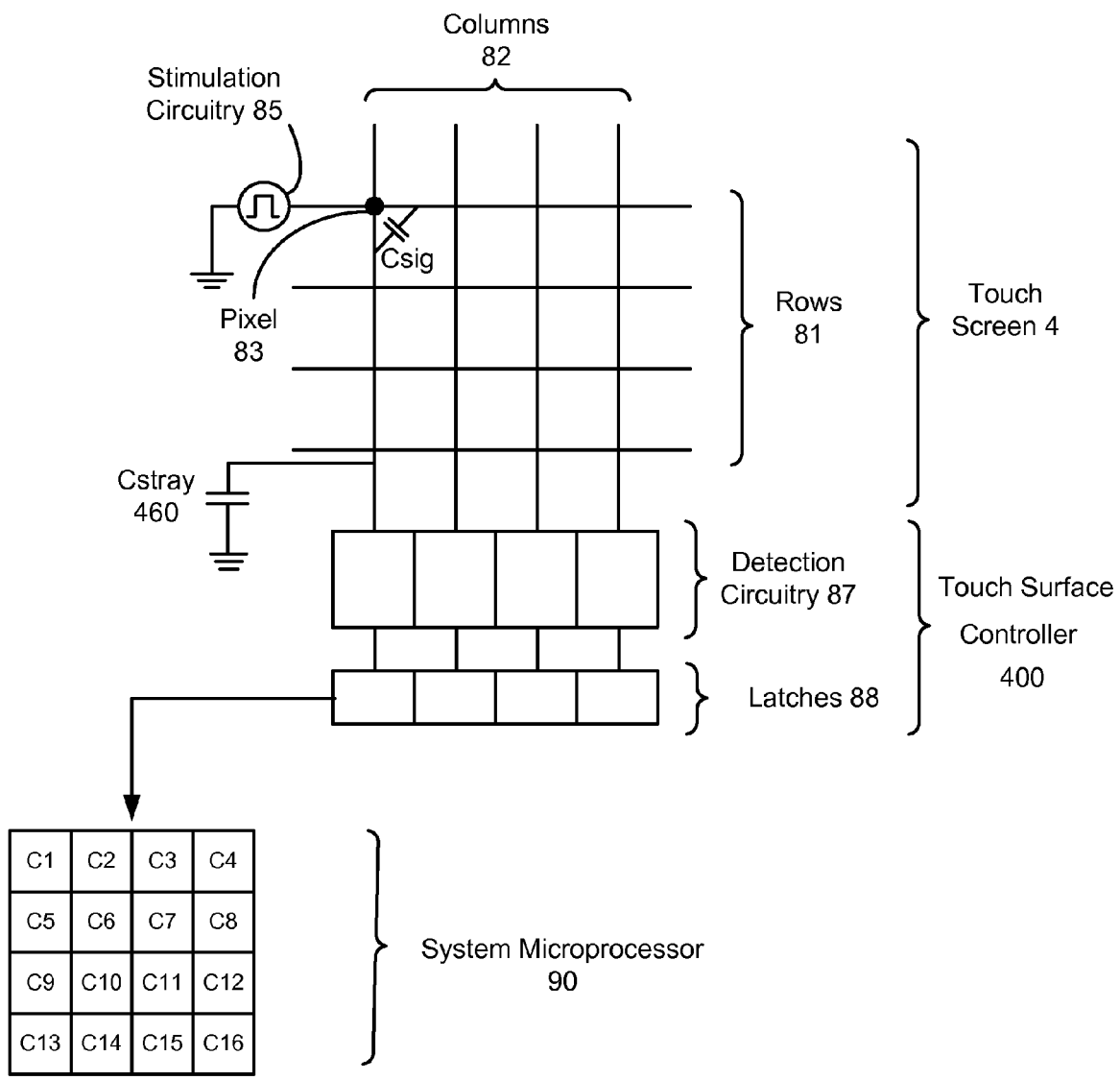
FIG. 1 shows an array of pixels in a touch surface, related detection circuitry, and the interfacing with a system microprocessor.
Figure 2A:
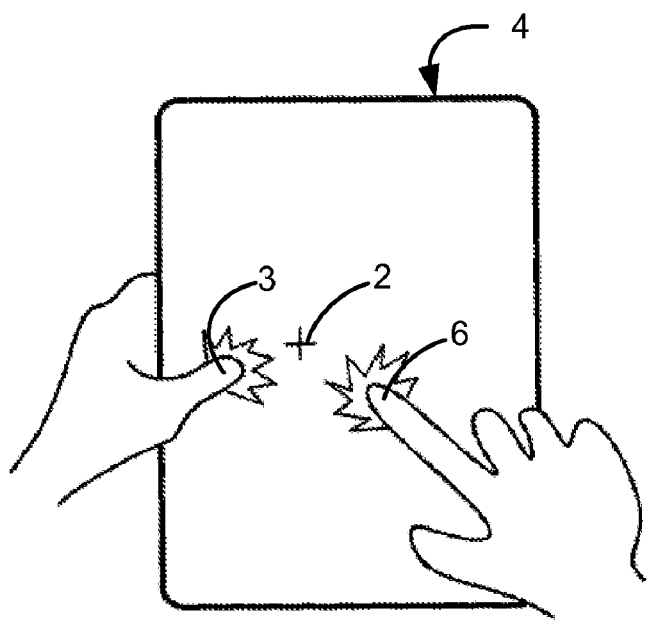
FIGS. 2A and 2B show certain problems with prior art touch screen technologies.
Figure 2B:
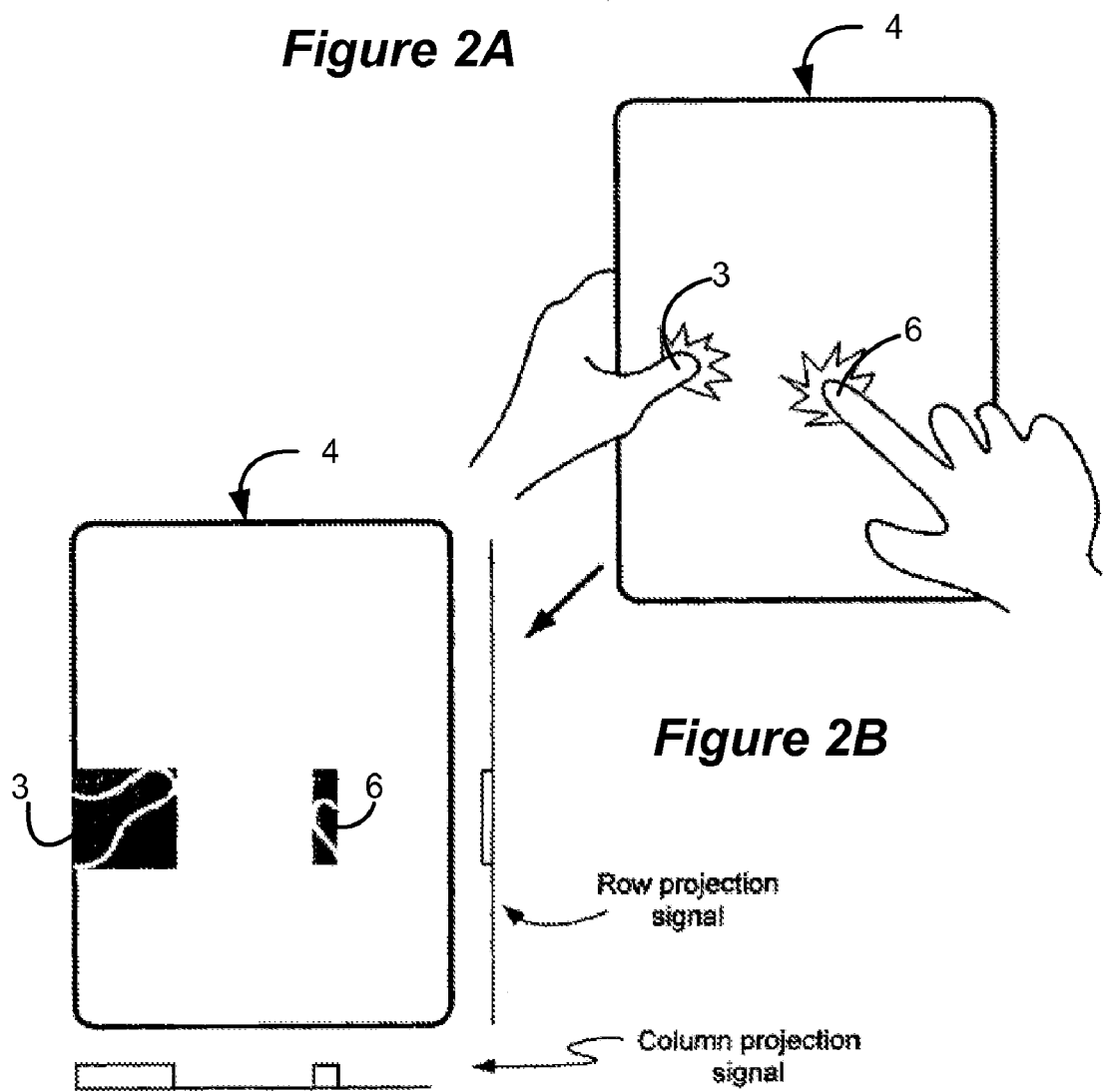
Figure 3A:
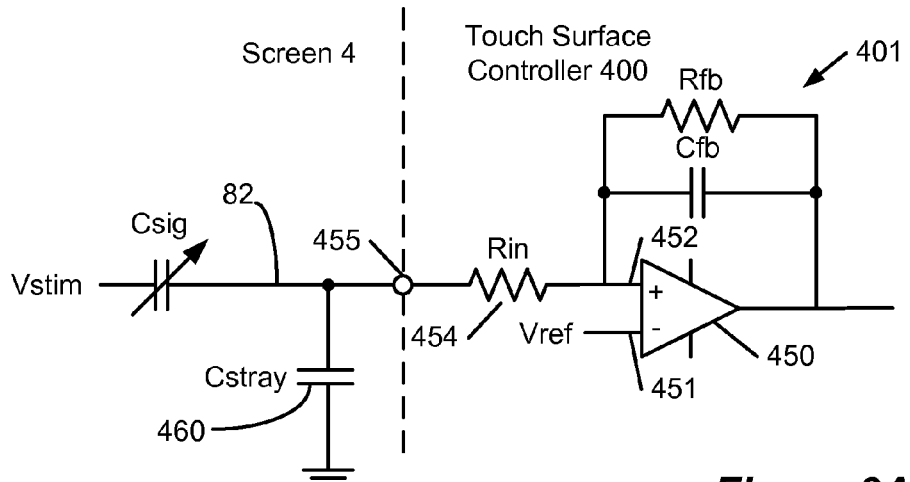
FIGS. 3A and 3B show a touch screen controller from U.S. patent application Ser. No. 11/381,313 which detects signal capacitance using analog techniques.
Figure 3B:
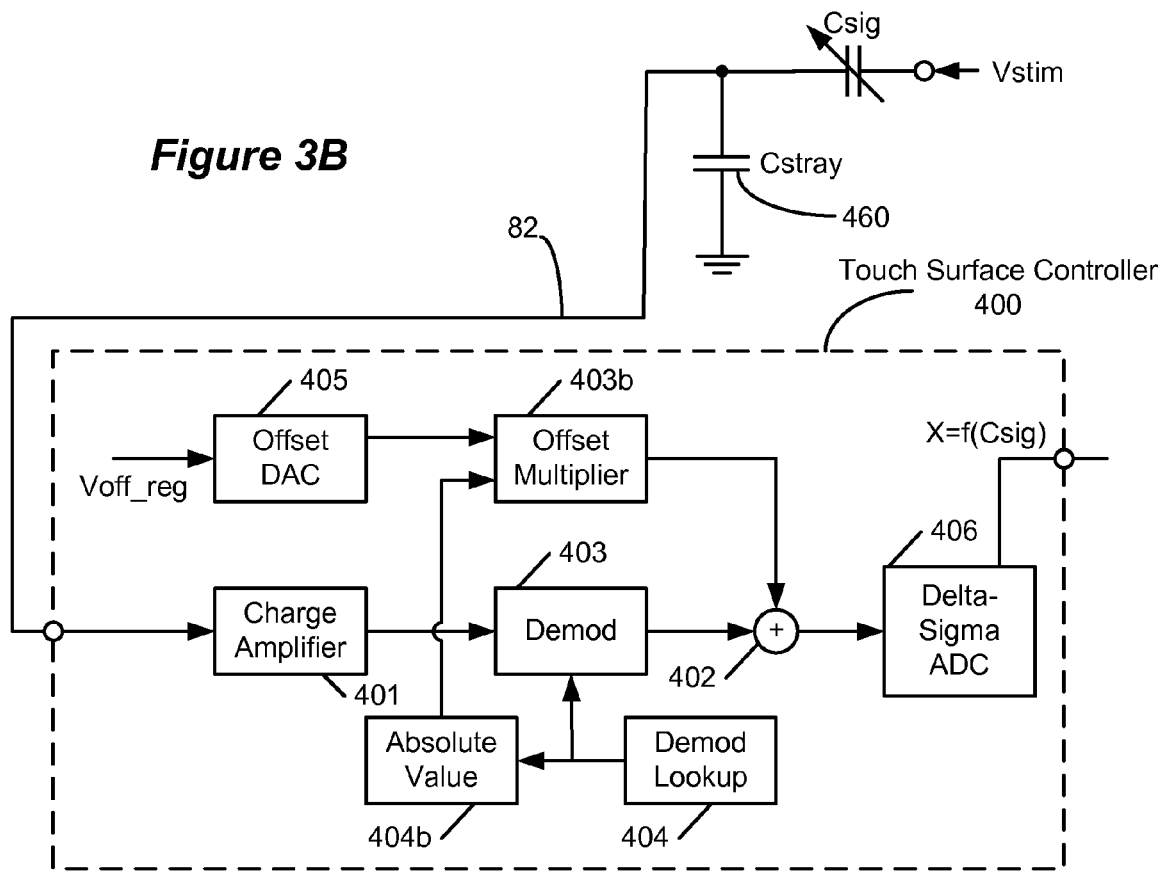
Figure 4:
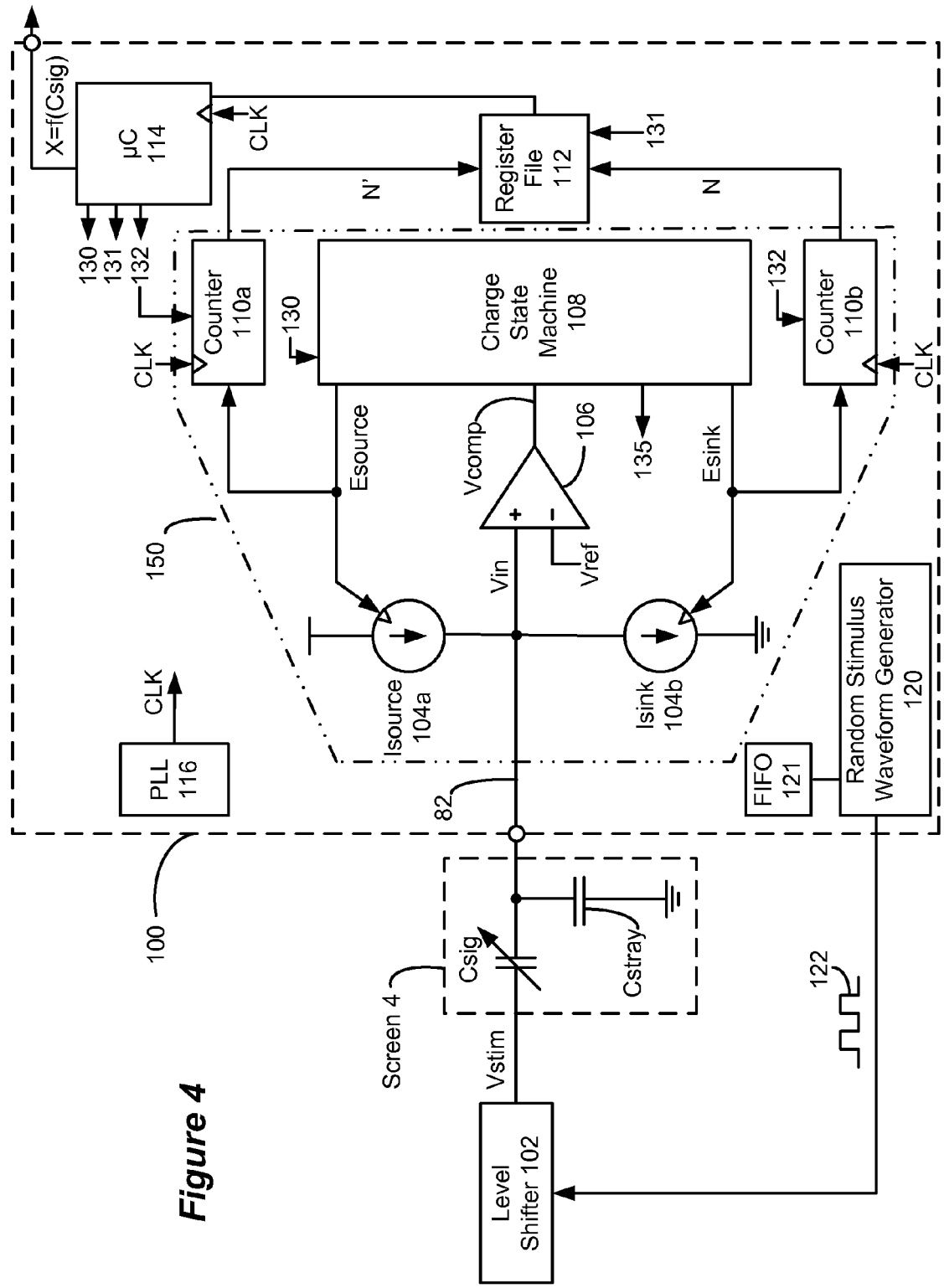
FIG. 4 shows an improved touch surface controller in accordance with an embodiment of the invention, which in particular includes digital detection circuitry.

An embodiment of the touch surface controller 100 disclosed herein employs improved detection circuitry 150 which, by virtue of its largely digital nature, is easier and simpler to implement. Such circuitry is shown in FIG. 4. As shown, the touch surface controller 100 preferably both stimulates the pixels in the touch screen 4, and also detects the capacitance of those pixels in response to that stimulus. Ultimately, a representation of the detected capacitance, X, is output to a microprocessor in a computer system (not shown) which amongst other functions interprets the capacitance values from the array of pixels to determine where a touch or simultaneous multiple touches have occurred on the screen 4, as discussed earlier. In a preferred embodiment, the touch surface controller 100 is implemented as an ASIC. However, this is not strictly necessary as the functionality of the controller 100 can be implemented in many different manners as one skilled in the art will appreciate.

Although improved detection circuitry 150 is the primary feature of interest in this disclosure, stimulation of the pixels in the screen 4 by the controller 100 is first discussed. As shown in FIG. 4, the controller 100 contains a waveform generator 120 for producing a square waveform 122 for stimulating the pixels in the screen 4. This waveform 122 is in turn preferably sent to a level shifter 102 to adjust the DC level of the waveform 122 from a level appropriate for the controller 100 (e.g., 3 V) to a value suitable for stimulating the pixels in the screen 4 (e.g., to 18V). This shifted waveform, Vstim, is shown in the waveforms of FIG. 5.

Figure 5:
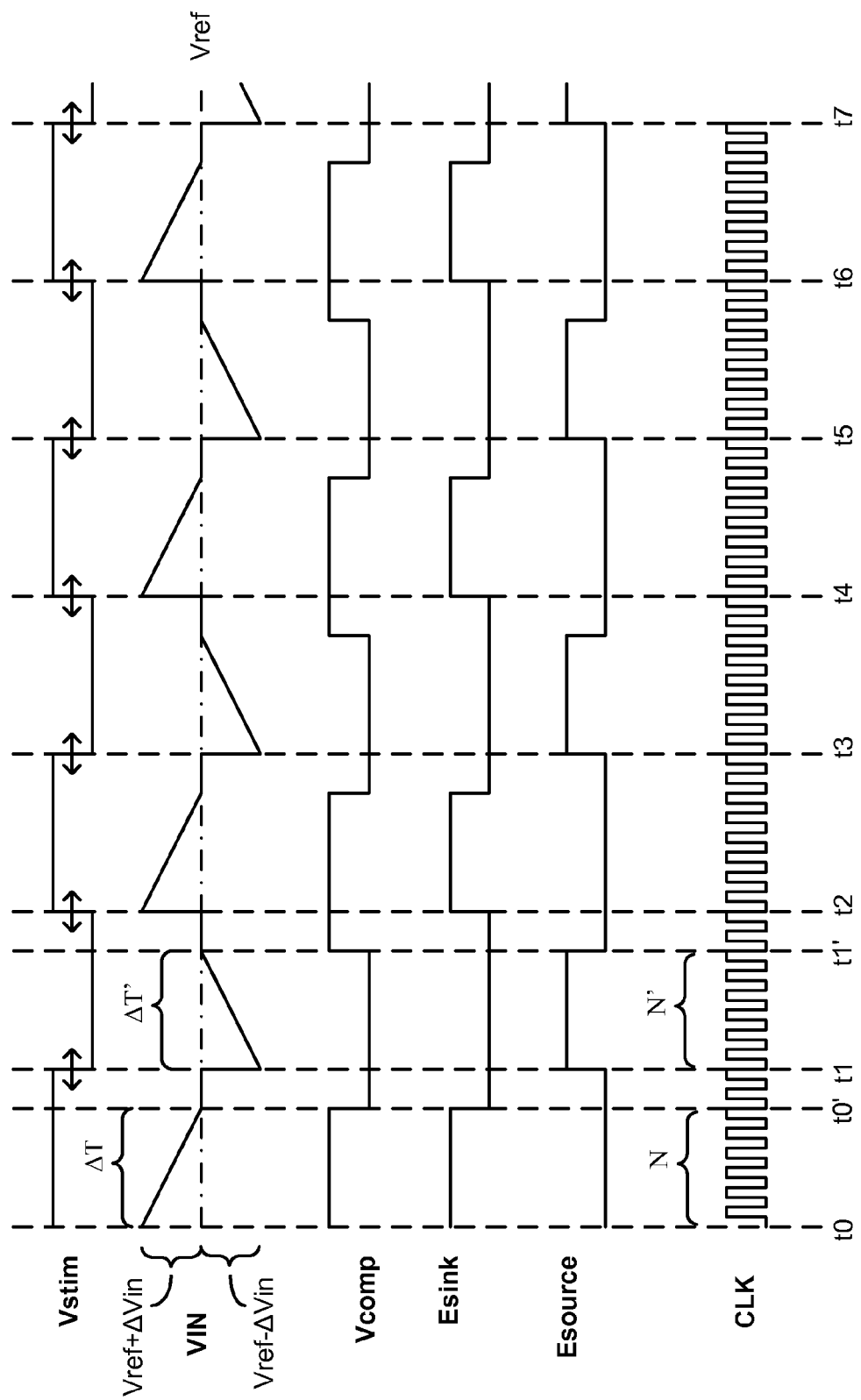
FIG. 5 shows various waveforms illustrating the operation of the touch screen controller of FIG. 4.

In a preferred embodiment, the rising and falling edges of the stimulus waveform, Vstim, are intentionally randomized, as shown by the arrows in FIG. 5. This is a noise reduction strategy, which randomizes the frequency content of the stimulus waveforms so as to mask the effect of any interfering frequencies that might be present due to externally-injected noise. To so randomize the stimulus waveform, the periods of each cycle of the waveform are varied in a quasi-random fashion using a First-In-First-Out (FIFO) look up table 121 associated with the waveform generator 120 that contains the time interval data for each integration cycle (i.e., from time t0 to t1, from t1 to t2, etc.). As an alternative to perturbing the stimulus waveform in this manner, different stimulus waveforms frequencies can be used, as discussed in the above-incorporated '313 application.

As noted, a primary aspect of this disclosure relates to simplified methodologies for detecting the capacitance (Csig) of the pixels in the screen 4. As discussed in the Background section, this capacitance can be varied by a touch, and thus detecting and quantifying this capacitance informs the computer system of the location of the touch.

The approach enabled by the detection circuitry 150 of FIG. 4 quickly produces a digital representation of the pixel capacitance, Csig, without the need for analog signal conditioning by means of amplification, mixing, and offset subtraction and thus yields an inexpensive and simpler design for controller 100, as the signal conditioning functions can essentially performed in the digital rather than the analog domain. As shown, the stimulus signal, Vstim, is applied to a pixel in the screen (4). The pixel capacitance, Csig, and the stray capacitance, Cstray, which forms a portion of the RC parasitics of the screen 4, comprise a voltage divider which forms voltage Vin. Specifically, $$Vin = [Csig/(Csig+Cstray)] * Vstim \quad \text{(Eq. 1)}$$

This divided voltage, Vin, is input into a comparator 106, whose inverting terminal is connected to a reference voltage, Vref The comparator 106 will output a '1' (i.e., Vcomp='1') when Vin>Vref, as shown in the waveforms of FIG. 5.

Starting at time t0, and as shown in FIG. 5, it is preferred that Vin nominally be set to a value that is slightly greater than Vref, i.e., Vref+ΔVin, which as noted above provides a comparator 106 output, Vcomp, of '1.' This output, Vcomp, is input to a charge state machine 108. The primary function of the state machine 108 is to enable and disable the current source 104*a* and the current sink 104*b*, as explained below. As also explained below, the time during which current source and/or sink 104*a* or *b* is enabled ultimately comprises a digital measurement of the capacitance of interest, Csig. However, before explaining why this is so and how this is accomplished, the basic operation of the detection circuitry is first discussed.

The charge state machine 108 interprets Vcomp='1' as meaning that excessive charge is present at the input, Vin, of the comparator 106. In accordance with an embodiment of the detection technique, this excess charge is pulled from Vin by enabling current sink 104(*b*). Specifically, the charge state machine 108, in response to sensing that Vcomp='1', provides an enable signal, Esink, to the current sink 104(*b*), which in turn produces a current, Isink. This enable signal, Esink, is shown in FIG. 5.

As can be seen further in FIG. 5, as the current sink 104*b* continues to operate, the voltage at input Vin begins to decline until Vin<Vref at time t0'. At that point, Vcomp='0', which the state machine 108 interprets as meaning that it is no longer necessary to enable the current sink 104*b*. Accordingly, enable signal Esink is disabled, and Vin is held just below Vref.

The effect of reducing the charge of Cstray at node Vin is to gradually reduce its voltage from Vref+ΔVin to approximately Vref. In other words, the voltage is made to change from time t0 to time t0' by the amount of ΔVin. From Equation (1), this differential input voltage can be characterized as:

$$\Delta Vin = [Csig/(Csig+Cstray)] * \Delta Vstim \quad \text{(Eq. 2)}$$

Moreover, from the well-known equation I=C dV/dt, it is observed that:

$$Isink = Cstray * (\Delta Vin/\Delta T) \quad \text{(Eq. 3)}$$

When Equation (2) is substituted into Equation (3), and solved for ΔT the following equation results:

$$\Delta T = \Delta Vstim * (Cstray * Csig) / [(Cstray + Csig) * Isink] \quad \text{(Eq. 4)}$$

From Equation (4), it can be seen that ΔT varies with Csig, the only other variable in Equation (4). As a result, ΔT, i.e., the time the current sink 104(*b*) must be enabled to degrade the input voltage by ΔVin, provides a measure of Csig.

Although there are many different possible ways to measure ΔT so as to infer Csig, in a preferred embodiment, ΔT is measured digitally, thus amounting to a measure for Csig which is also digital in nature. Such a digital measurement of ΔT in a preferred embodiment uses the internal clock of the controller, CLK, which is generated by a phased lock loop (PPL) 116. The PLL 16 is otherwise used to clock the central microcontroller 114 of the controller 100. The CLK signal has a significantly smaller period than does the expected duration of ΔT and/or the duration of a particular integration cycle, and can for example be 100 times smaller for example. Because of this, the CLK signal can be used to measure ΔT with a precise resolution. As shown in FIG. 4, the CLK signal is sent to a counter 110*b*, which counts a number of cycles, N, of the clock while the current sink enable signal, Esink, is active. Once Esink is disabled, the counter 110*b* stops counting and outputs this number of cycles N to a register file 112 where it is stored.

To summarize, measurement of the signal of interest, Csig, is effectuated by counting the number of clock cycles N needed to deplete the excessive charge ΔVin from the input to the comparator 106. Note that this measurement N is digital, and that no analog processing (such as demodulation) is necessary to arrive at a result of Csig. As can be appreciated, the disclosed detection circuitry is thus much simpler and cost-effective to implement.

Csig can also be measured using the disclosed technique when the stimulation pulse Vstim is not active, i.e., during a next integration cycle between t1 and t2 in FIG. 5. At t1, Vstim goes to zero volts, which causes Vin to be reduced below Vref by a given amount, ΔVin. Otherwise, the detection circuitry 150 operates basically as before, but instead with the goal of increasing the voltage at Vin to Vref. Thus, in response to Vcomp='0', the state machine 108 sends an enable signal, Esource, to current source 104*a*, which outputs a current, Isource (preferably equal to Isink, where both Isource and Isink=Ics). As the current source 104*a* operates to provide charge to the input node Vin, the voltage at that node starts to increase. At time t1', Vin is now slightly above Vref, and Vcomp is set once again to '1'. The state machine 108 then deasserts Esource to shut off current source 104*a*. As before, during the period that Esource is asserted, another counter 110*a* counts the clock cycles N' to in effect measure the time ΔT' that Esource is active. Because the mathematics is the same, ΔT' also yields a measurement N' that provides a digitized indication of Csig, which again can be stored in register file 112.

As one skilled in the art of touch surface controllers will appreciate, the number of measurements of N and N' taken for each pixel will generally occur over a much shorter time interval than any relevant touch (e.g., finger) events. Accordingly, it is logical to average these measurements in the controller 110 before exportation the computer system's microprocessor (not shown) for further interpretation. For example, the internal microcontroller 114 in the controller 100 can receive both N and N' and average the two to arrive at digital signal X to be exported to the system microprocessor which digitally indicates the signal of interested, Csig; or X can comprise the average of more than one integration cycle (e.g., N1, N1', N2, and N2', etc.); or the average of a certain numbers of N (from counter 110*b*) or N' (from counter 110*a*). Of course, if the system microprocessor (not shown) is equipped to handle individual measurements, the exported values X can also comprise the individual measurements.

The disclose touch surface controller 100 provides other benefits that may not be immediately recognizable, but which are explained below.

For example, the system is capable of providing a measurement N that is linearly proportional to the signal capacitance, Csig. In other words, dN/dCsig equals a constant. This is beneficial because it provides an unvarying resolution independent of the magnitude of Csig, which might otherwise vary between touch panel designs or production runs. The following equation correlates the change in the measurement, dN, to a change in signal capacitance, dCsig:

$$dN = 2*Nint*fclk*Vstim* \\ dCsig/(Ics*((Csig2/Cstray2)+Csig*dCsig/Cstray^2+1)) \quad \text{(Eq. 5)}$$

where, the number '2' accounts for charge and discharge cycle per integration cycle; Nint is the number of integration cycles, fclk is the frequency of the clock, CLK; Ics is the sink or source current; dCsig is the change in signal capacitance; and Cstray is the static stray capacitance of the column electrode.

Since Cstray is much larger than Csig in a realistic touch screen application, equation (5) can be simplified to:

$$dN=2\times Nint*fclk*Vstm*dCsig/Ics \quad \text{(Eq. 6)}$$

or $$dN/dCSIG=2\times Nint*fclk*Vstm/Ics \quad \text{(Eq. 7)}$$

The equation shows that the change in readings, dN, is in good approximation linearly proportional to the change in signal capacitance, dCsig.

Moreover, Equation (7) shows that the static stray capacitance, Cstray, essentially drops out of the equation, such that the count, dN, is purely a function of the signal capacitance, Csig. In fairness, the analog implementation of the '313 application is also capable of rejecting stray capacitance by keeping the input node at virtual ground, effectively maintaining the voltage across the stray capacitance and thus effectively eliminating the stray capacitance because its net-charge is zero. Moreover, offset compensation for the digital controller 100 is still necessary. Most of the signal ΔVin is static, and there is only a small change of ΔVin due to the modulation of Csig by dCsig. Therefore, a large portion of the result stored in the counters 110a 110b after each integration cycle is also static. However, the offset compensation is easily addressed in the digital controller 100 either by dedicated offset circuitry operating in the digital domain or by the microcontroller. In either case, the digital offset compensation is much simpler to implement than the analog offset compensation illustrated above with respect to the '313 application.

Additionally, the improved design for the controller 100 is capable of rejecting any dynamic stray capacitance, dCstray. Dynamic stray capacitance can result on a given column when the user touches a pixel lying along that column. When present, the added stray capacitance on that column affects all pixels along that column, such that all pixels on the column may erroneously be interpreted as the location of a touch. It is accordingly important to limit the effect of the dynamic stray capacitance.

The change of measurement dN related to added dynamic stray capacitance dCstray, translated to a percentage, is:

$$dN=100*(1-[Cs^3/(Cs^3+Csig^2*dCstray)]) \quad \text{(Eq. 8)}$$

where $Cs^3=Cstray*CSig^2+Cstray^2*Csig+Csig*Cstray*dCstray$. Since Csig is much smaller that Cstray, $Cs^3$ is much greater that $Csig^2*dCstray$, and hence Equation (8) can be simplified to:

$$dN\sim 100*(1-[Cs^3/Cs^3])\sim 0 \quad \text{(Eq. 9)}$$

In short, the count N is essentially independent of changes to Cstray, i.e., dCstray.

Reasonable assumptions justify this conclusion. In an exemplary embodiment, Cstray is approximately equal to 18 pF, Csig is approximately equal to 0.7 pF, and dCstray (assuming for sake of argument that it is relatively large) might be equal to a value as high as 20 pF. Assuming these values, dN as computed from Equation (8) would be 2.1%. Because it is typically permissible for dN to be ≦15%, a 2.1% change in N for corresponding changes in Cstray is permissible, and essentially negligible. In short, these numbers justify the ability of the disclosed technique to reject dynamic stray capacitance.

The total number of integration cycles Nint and thus integration time is programmable via the microcontroller 114 and determines the resolution of the measurement, N. Prolonging the integration time yields higher resolution of the dCsig measurement and also reduces the effect of induced noise, at the expense of spending more time for each measurement. The microcontroller 114 initiates a measurement by first resetting the counters 110a and 110b via signal 132 then enabling the charge state machine 108 via control signal 130. After a programmable integration period set by programmable parameter Nint, the microcontroller 114 loads the count values N and N' into register file 112 via load signal 131.

The controller 100 may have registers that allow setting the voltage reference level for the comparator 106 and for setting the sink and source current for current sources 104a and 104b via microcontroller 114. In yet another embodiment, either the microcontroller 114 and/or other dedicated logic may randomize or vary the sink and/or source currents and/or reference voltage Vref during an integration interval to reduce the systems susceptibility to externally introduced noise.

Note that as drawn in FIG. 4, the detection circuitry 150 actually comprises a channel which handles one column 82 of the screen 4. Thus, in a standard application, there would be as many channels as there are columns.

It is important to ensure that a next transition of Vstim does not occur until the charge or discharge cycle of all channels (150) have completed. To ensure this, the charge state machine 108 of each channel provides a hold signal 135 to indicate whether a charge/discharge cycle is in progress. Assuming that the hold signal 135 is active high, and that the hold signals from each channel are logically ORed together (not shown), the resulting signal, when low, indicates to the microcontroller 114 that all the channels have completed their respective charge/discharge cycles. At that point, the microcontroller 114 can signal the waveform generator 120 to retrieve the next random stimulus value(s) from FIFO 121 and to output an appropriate stimulus waveform.

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A controller for a touch surface having a plurality of capacitive pixels, each capacitive pixel having a first electrode and a second electrode, different from the first electrode and defining a pixel capacitance therebetween, the controller comprising:

stimulation circuitry for applying a stimulation voltage having a first and second voltage level to only the first electrode of at least some of the plurality of capacitive pixels, a plurality of detection circuits, one detection circuit corresponding to each channel defined as a group of capacitive pixels arranged along a given direction; each detection circuit comprising:

input circuitry having an input node capable of being coupled to the second electrode of the at least some of the plurality of capacitive pixels for detecting the pixel capacitance of the at least some of the plurality of capacitive pixels, wherein a change in the pixel capacitance at a given pixel indicates proximity of a touch to that pixel;

charging and discharging circuitry for alternately charging the capacitive pixels to a reference voltage after the stimulus voltage of the first voltage level is applied to the first electrode of the capacitive pixels, and discharging the capacitive pixels to the reference voltage after the stimulus voltage of the second voltage level is applied to the first electrode of the capacitive pixel;

the charging and discharging circuitry generating a hold signal indicating whether a charging or discharging of the capacitive pixels is in progress; and counting circuitry for digitally counting at least one of a charging time period to charge the capacitive pixels to the reference voltage and a discharging time period to discharge the capacitive pixels to the reference voltage, each of the charging time period and the discharging time period indicative of pixel capacitance of the at least some of the plurality of capacitive pixels;

wherein the hold signals from each channel are logically combined to indicate whether a charging or discharging of the capacitive pixels is in progress for any channel and wherein the stimulation circuitry is prevented from applying another stimulation voltage until the logically combined hold signals indicates that all channels have completed their respective charging and discharging.

2. The controller of claim 1, wherein the wherein the plurality of capacitive pixels are arranged in rows and columns, and wherein the input circuitry is coupled to each column, each column corresponding to one of the channels.

3. The controller of claim 2, wherein the charging and discharging time periods are independent of changes in stray capacitance due to touching of the touch surface.

4. The controller of claim 1, wherein the input circuitry comprises a comparator, and wherein the input node comprises a first input to the comparator, and wherein the reference voltage comprises a second input to the comparator.

5. The controller of claim 1, wherein the charging and discharging circuitry includes a current source and a current sink respectively and the counting circuitry digitally counts a time period to charge and discharge the capacitive pixels to the reference voltage.

6. The controller of claim 5, further comprising a state machine, other than the charging and discharging circuitry, for enabling and disabling the current source and current sink respectively.

7. The controller of claim 4, further comprising means for randomizing or varying the reference voltage to reduce noise susceptibility.

8. The controller of claim 1, further comprising means for randomizing or varying a frequency content of the stimulation voltage to reduce noise susceptibility.

9. A controller for a touch surface having a plurality of capacitive pixels arranged in rows and columns, each capacitive pixel having a first electrode and a second electrode, different from the first electrode, the controller comprising:

stimulation circuitry for applying a stimulation voltage to the first electrode of at least some of the plurality of capacitive pixels, the stimulation voltage having a periodic waveform and having a first and second voltage level;

a plurality of detection circuits, one detection circuit corresponding to each channel defined as a group of capacitive pixels arranged along a given direction; each detection circuit comprising:

input circuitry having an input node coupled to the second electrode of the plurality of capacitive pixels for each column for detecting the capacitance of the capacitive pixels;

charging and discharging circuitry coupled to the input node for alternately charging the capacitive pixels to a reference voltage after the stimulus voltage of the first voltage level is applied to the first electrode of the capacitive pixels, and discharging the capacitive pixels to the reference voltage after the stimulus voltage of the second voltage level is applied to the first electrode of the capacitive pixel;

the charging and discharging circuitry generating a hold signal indicating whether a charging or discharging of the capacitive pixels is in progress; and counting circuitry for digitally counting a charging time period to charge the input node to the reference voltage and a discharging time period to discharge the input node to the reference voltage, each of the charging and discharging time periods indicative of the capacitance of the capacitive pixels; and wherein the controller further comprises:

processing circuitry for averaging the charging and discharging time periods over multiple charging and discharging cycles to obtain an average value indicative of the capacitance of the capacitive pixels; and wherein the hold signals from each channel are logically combined to indicate whether a charging or discharging of the capacitive pixels is in progress for any channel and wherein the stimulation circuitry is prevented from applying another stimulation voltage until the logically combined hold signals indicates that all channels have completed their respective charging and discharging.

10. The controller of claim 9, wherein the charging and discharging time periods are independent of changes in a stray capacitance associated with each column due to touching of the touch surface.

11. The controller of claim 9, wherein the detection circuitry comprises a comparator, and wherein the input node comprises a first input to the comparator, and wherein the reference voltage comprises a second input to the comparator.

12. The controller of claim 9, wherein the charging and discharging circuitry includes a current source and a current sink respectively and the counting circuitry digitally counting a time period to charge and discharge the capacitive pixels to the reference voltage.

13. The controller of claim 12, further comprising a state machine, other than the charging and discharging circuitry, for enabling and disabling the current source and current sink respectively.

14. The controller of claim 11, further comprising means for randomizing or varying the reference voltage to reduce noise susceptibility.

15. The controller of claim 9, further comprising means for randomizing or varying a frequency content of the stimulation voltage to reduce noise susceptibility.

16. A method for operating a touch surface, the touch surface having a plurality of capacitive pixels, each capacitive pixel having a first electrode and a second electrode, different from the first electrode, the method comprising:
    stimulating the first electrode of at least some of the plurality of capacitive pixels with a stimulation waveform having a first and second voltage level;
    detecting the stimulation waveform at the second electrode of the at least some of the plurality of capacitive pixels at an input node of a detecting circuit;
    alternately charging the input node to a reference voltage after stimulating the first electrode with the stimulation waveform having the first voltage level and discharging the input node to the reference voltage after stimulating the first electrode with the stimulation waveform having the second voltage level; and
    digitally counting at least one of a charging time period to charge the input node to the reference voltage and a discharging time period to discharge the input node to the reference voltage, each of the charging and discharging time periods indicative of a capacitance of the capacitive pixels;
    generating a hold signal indicating whether a charging or discharging of the capacitive pixels is in progress for any one of a plurality of channels, each channel defined by a group of capacitive pixels arranged in a given direction;
    logically combining the hold signals for each channel to indicate whether a charging or discharging of the capacitive pixels is in progress for any channel; and
    inhibiting another stimulation of the first electrodes until the logically combined hold signals indicates that all channels have completed their respective charging and discharging.

17. The method of claim 16, wherein the stimulation waveform is randomized in its frequency content.

18. The method of claim 16, wherein digitally counting the charging and discharging time periods comprises counting a number of clock cycles.

19. The method of claim 16, wherein the input node is coupled to a first input of a comparator, and wherein a second input of the comparator is coupled to the reference voltage.

20. The method of claim 19, wherein an output of the comparator is used together with a state machine to enable a current source and a current sink used to charge and discharge the input node.

21. A method for operating a multi-touch surface, the multi-touch surface having a plurality of capacitive pixels, each capacitive pixel having a first electrode and a second electrode, different from the first electrode, the method comprising:
    stimulating the first electrode of at least some of the plurality of capacitive pixels with a stimulation waveform having a first and second voltage level;
    receiving multiple touches at various ones of the capacitive pixels among the at least some of the plurality of capacitive pixels;
    detecting a change in the capacitance at the second electrode of the various ones of the capacitive pixels, the detecting including:
    alternately charging the second electrode to a reference voltage after stimulating the first electrode with the stimulation voltage of the first voltage level and discharging the second electrode to the reference voltage after stimulating the first electrode with the stimulation voltage of the second voltage level; and
    digitally counting a charging time period to charge the second electrode to the reference voltage and a discharging time period to discharge the second electrode to the reference voltage, each of the charging and discharging time periods indicative of the capacitance of the capacitive pixels;
    generating a hold signal indicating whether a charging or discharging of the capacitive pixels is in progress for any one of a plurality of channels, each channel defined by a group of capacitive pixels arranged in a given direction;
    logically combining the hold signals for each channel to indicate whether a charging or discharging of the capacitive pixels is in progress for any channel; and
    inhibiting another stimulation of the first electrodes until the logically combined hold signals indicates that all channels have completed their respective charging and discharging.

22. The method of claim 21, wherein detecting a change in the capacitance of the various ones of the capacitive pixels comprises stimulating the first electrodes with a square wave randomized in its frequency content.

23. The method of claim 21, wherein counting the charging and discharging time periods comprises counting a number of clock cycles necessary to charge and discharge the second electrode.

24. The method of claim 21, wherein detecting a change in the capacitance of the various capacitive pixels comprises comparison of a voltage on the second electrode with the reference voltage, and wherein the method further comprises:
    averaging the charging and discharging time periods over multiple charging and discharging cycles to obtain an average value indicative of the capacitance of the capacitive pixels.

25. A touch sensitive electronic device comprising:
    a touch screen including:
    a plurality of first traces disposed in a first direction;
    a plurality of second traces disposed transverse to and spaced apart from the plurality of first traces and forming a capacitive pixel at the intersection of each first and second trace, each capacitive pixel having a capacitance defined between the intersecting first and second trace; and
    control circuitry including:
    stimulation circuitry for generating a stimulus waveform having at least a first and second voltage level, the stimulus waveform applied to only the plurality of first traces or the plurality of second traces so as to apply the stimulus waveform to only one side of each of the capacitive pixels, the other side of each capacitive pixel coupled to ground through a stray capacitance;
    a plurality of detection circuits, one detection circuit corresponding to each channel defined as a group of capacitive pixels arranged along a given direction; each detection circuit comprising;
        a comparator having an input node coupled to the other side of the capacitive pixel, the comparator having a reference input connected to receive a reference voltage;
        a current source and a current sink connected to the input node to alternately charge and discharge the input node to the reference voltage;
        the detection circuit operative to enable operation of the current source and current sink to charge and discharge the input node after a change in the stimulus waveform is applied to only the plurality of first traces or the plurality of second traces;

means for generating a hold signal indicating whether a charging or discharging of the capacitive pixels is in progress;

means for digitally counting at least one of a charging time period to charge the input node to the reference voltage and a discharging time period to discharge the input node to the reference voltage, each of the charging and discharging time periods indicative of the capacitance of the capacitive pixels; and wherein the control circuitry further comprises:

means for logically combining the hold signals to indicate whether a charging or discharging of the capacitive pixels is in progress for any channel; and means for preventing the stimulation circuitry from generating another stimulus waveform until the logically combined hold signals indicates that all channels have completed their respective charging and discharging.

26. The electronic device as recited in claim 25 wherein the detection circuitry comprises a state machine.

27. A touch sensitive electronic device comprising:

a touch screen including:

a plurality of first traces disposed in a first direction;

a plurality of second traces disposed transverse to and spaced apart from the plurality of first traces and forming a capacitive pixel at the intersection of each first and second trace, each capacitive pixel having a capacitance defined between the intersecting first and second trace; and control circuitry including:

stimulation circuitry for generating a stimulus waveform having at least a first and second voltage level, the stimulus waveform applied to only the plurality of first traces or the plurality of second traces so as to apply the stimulus waveform to only one side of each of the capacitive pixels, the other side of each capacitive pixel coupled to ground through a stray capacitance;

detection circuitry including a comparator having an input node coupled to the other side of the capacitive pixel, the comparator having a reference input connected to receive a reference voltage;

a current source and a current sink connected to the input node to alternately charge and discharge the input node to the reference voltage;

the detection circuitry operative to enable operation of the current source and current sink to charge and discharge the input node after a change in the stimulus waveform is applied to only the plurality of first traces or the plurality of second traces; and the detection circuitry including means for digitally counting at least one of a charging time period to charge the input node to the reference voltage and a discharging time period to discharge the input node to the reference voltage, each of the charging and discharging time periods indicative of the capacitance of the capacitive pixels;

wherein the means for digitally counting determines a time period according to the formula:

$$\Delta T = \Delta Vstim * (Cstray * Csig) / [(Cstray + Csig) * Isink]$$

where, $\Delta T$ is the time for charging or discharging, $\Delta Vstim$ is the change in the stimulus waveform, Cstray is the stray capacitance, Csig is the capacitance of the capacitive pixel, and Isink is the current of the current source or current sink.

28. The electronic device as recited in claim 25 further comprising means for randomizing or varying the sink or source currents to reduce noise susceptibility.

29. The electronic device as recited in claim 25 further comprising means for randomizing or varying the reference voltage to reduce noise susceptibility.

30. A touch sensitive electronic device comprising:

a touch screen including:

a plurality of first traces disposed in a first direction;

a plurality of second traces disposed transverse to and spaced apart from the plurality of first traces and forming a capacitive pixel at the intersection of each first and second trace, each capacitive pixel having a capacitance defined between the intersecting first and second trace; and control circuitry including:

stimulation circuitry for generating a stimulus waveform, the stimulus waveform, applied to only the plurality of first traces or the plurality of second traces so as to apply the stimulus waveform to only one side of each of the capacitive pixels, the other side of each capacitive pixel coupled to ground through a stray capacitance;

a plurality of detection circuits, one detection circuit corresponding to each channel defined as a group of capacitive pixels arranged along a given direction; each detection circuit comprising;

a comparator having an input node coupled to the other side of the capacitive pixel, the comparator having a reference input connected to receive a reference voltage;

a current source and a current sink connected to the input node to alternately charge and discharge the input node to the reference voltage;

the detection circuit operative to enable operation of the current source and current sink to charge and discharge the input node after a change in the stimulus waveform is applied to only the plurality of first traces or the plurality of second traces; and means for generating a hold signal indicating whether a charging or discharging of the capacitive pixels is in progress; and a digital timing circuit operatively coupled to the output of the comparator for digitally at least one of a charging time period to charge the input node to the reference voltage and a discharging time period to discharge the input node to the reference voltage, each of the charging and discharging time periods indicative of the capacitance of the capacitive pixels; and wherein the control circuitry further comprises:

means for logically combining the hold signals to indicate whether a charging or discharging of the capacitive pixels is in progress for any channel; and means for preventing the stimulation circuitry from generating another stimulus waveform until the logically combined hold signals indicates that all channels have completed their respective charging and discharging.

31. The electronic device as recited in claim 30 further comprising means for randomizing or varying the sink or source currents to reduce noise susceptibility.

32. The electronic device as recited in claim 31 further comprising means for randomizing or varying the reference voltage to reduce noise susceptibility.

33. The electronic device as recited in claim 30 further comprising means for randomizing or varying the reference voltage to reduce noise susceptibility.

* * * * *